March 23, 1943.  G. L. DIMMICK  2,314,392
MONITORING DEVICE
Filed Jan. 2, 1941
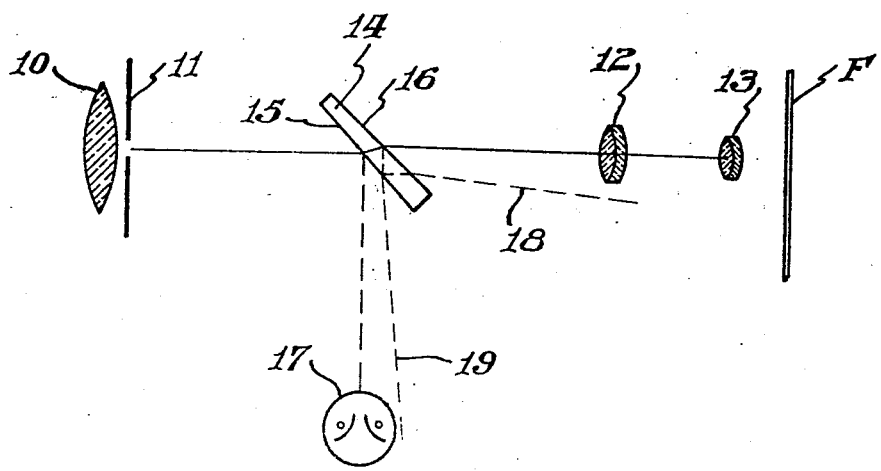
Inventor
Glenn L. Dimmick
By J. J. Huff
Attorney Patented Mar. 23, 1943

2,314,392

UNITED STATES PATENT OFFICE 2,314,392

MONITORING DEVICE

Glenn L. Dimmick, Haddonfield, N. J., assignor to Radio Corporation of America, a corporation of Delaware Application January 2, 1941, Serial No. 372,812

4 Claims. (Cl. 88—24)

This invention relates to monitoring devices for sound recording and more particularly to photoelectric monitoring devices for sound on film recording. It has heretofore been proposed to deflect a portion of the sound recording beam from the main optical path and to direct it onto a photocell so that the modulation of the light beam could be directly determined by listening to the amplified output from the photocell. These prior art devices were improved on by me in my application Serial No. 332,670, filed May 1, 1940, in which I provided a dichroic deflector so that only the portion of the light of a color not useful in the recording needed to be used for the monitor. In the monitoring systems of the prior art, however, the insertion of a diagonal reflector into the light beam caused a deflection of the light beam from the optical axis of the system and due to the reflection, however slight, from the two surfaces of the diagonal mirror produced a double image on the film. If a plane parallel reflector upwardly or downwardly was used a vertical displacement of the main recording beam would be produced, the amount of which depended upon the thickness of the plate. In addition a portion of the light beam would be reflected from the second surface of the plate toward the first surface and there again reflected, emerging parallel to the first beam but displaced therefrom, thereby producing a double image. This double image particularly when the original recording beam was of high intensity might tend to cause distortion in the sound record.

In the monitoring system according to the present invention the reflecting plate is made slightly wedge-shaped and is so positioned in the recording beam that the refraction due to the wedge-shape of the plate exactly offsets or counteracts the displacement of the beam due to the thickness of the plate. The introduction of the plate therefore does not affect the centering of the beam in the lenses. In addition, the angle between the two surfaces of the plate is such that the secondary reflected beam is deflected entirely outside of the field of the objective lens and therefore produces no double image.

One object of the invention is to provide an improved photoelectric monitoring system.

Another object of the invention is to provide an improved optical device for deflecting a portion of a beam of light without materially displacing the main beam.

Another object of the invention is to provide an optical device for deflecting a portion of a beam of light without producing any secondary image.

Another object of the invention is to provide a dichroic deflector of high transmission for the main recording beam which will deflect a monitoring beam without producing any secondary images.

Other and incidental objects of the invention will be apparent to those skilled in the art from a reading of the following specification and an inspection of the accompanying drawing in which the single figure is a longitudinal section through a recording optical system which may be used in conjunction with any customary type of modulated light source.

In the drawing, modulated light is directed through the condenser 10 onto the slit plate 11. Modulated light passing through the slit plate 11 is directed by the objective composed of the lenses 12 and 13 upon the filter F in the form of a fine line, in the usual manner. A light deflecting device 14 is inserted in the beam which may be a piece of ordinary crown glass or other material transparent to the light which is to be used in the recording. The surface 16 of the member 14 may be coated with a layer of transparent material such, for example, as calcium fluoride or as for the evaporation product of a mixture of calcium fluoride and aluminum oxide, as described and claimed in my application Serial No. 348,815, filed July 31, 1940, in order to reduce the reflection from the surface 16 to a minimum.

The surface 15 may be coated with a layer of material which is an odd plurality of quarter wave lengths in thickness of the light which is to be transmitted, as described in my application Serial No. 370,758, filed December 19, 1940, in order that this surface may be highly transparent to the recording light and at the same time selectively reflective of the monitoring light. The several lenses in the recording system may also be treated with coatings having a thickness of an odd plurality of quarter wave lengths in order that they may also be selectively transmissive.

Alternatively, the surface 15 of the member 14 may be coated with an appropriate dichroic reflector such, for example, as a thin layer of silver which will transmit ultra violet light and reflect the visible light which will affect the photocell 17, or any other desired type of dichroic surfacing may be provided.

As will be apparent from an inspection of the drawing, the beam of light traveling along the optical axis of the lenses 10, 12 and 13 will be refracted upwardly where it passes through the member 15. In order to counteract this refraction, I make the member 15 of greater thickness at its lower edge than at its upper edge and the amount of this thickness is so calculated that the beam will return to the center of the lens 12 where it would have been incident had the member 14 not have been interposed. The exact angle between the faces 15 and 16 is dependent, of course, upon the index of refraction of the material composing the wedge 14, the distance between the members 14 and 12 and the thickness of the member 14. If the distance between the member 14 and the member 12 is properly chosen then the angle between the surfaces 15 and 16 will be such that the beam reflected from the surface 16 to the surface 15 and which is only a small percentage of the light will emerge as the beam 18 which is deflected sufficiently to miss the lens 12 or at least so that no material portion of it will pass through both the lenses 12 and 13. Likewise, the beam 19 which is the reflected beam passing outward through the surface 15 will be sufficiently deflected so that it will not strike the monitoring photocell 17 and the photocell and therefore give an accurate indication of the effect produced by the main recording beam.

I claim as my invention:

1. In combination with a sound recording optical system, a monitoring device and a reflector located in the light path of said optical system for directing light to said monitoring device, said reflector including a wedge shaped refractive member located at an angle to the light path with its thinner edge toward the incident light, the angle of the wedge being such that the light of the main recording beam reaches the same point that it would if the refractive member were not present and the reflected secondary beams are directed entirely outside of the normal optical path.

2. In combination with a sound recording optical system having an objective lens, a monitoring device and a reflector located in the light path of said optical system for directing light to said monitoring device, said reflector including a wedge shaped refractive member located at an angle to the light path with its thinner edge toward the incident light, the angle of the wedge being such that the light directed to the objective lens reaches the same point on the objective lens that it would if the refractive member were not present and the reflected secondary beams are directed entirely outside of the normal optical path.

3. In combination with a sound recording optical system, a monitoring device and a reflector located in the light path of said optical system for directing light to said monitoring device, said reflector including a wedge shaped refractive member located at an angle to the light path, said wedge having two partly reflecting surfaces located at such an angle to each other that the reflected secondary beams are directed entirely outside of the normal optical path, one of said surfaces having a dichroic coating thereon highly transparent to the recording light and selectively reflective of the monitoring light.

4. In combination with a sound recording optical system, a monitoring device and a reflector located in the light path of said optical system for directing light to said monitoring device, said reflector including a wedge shaped refractive member located at an angle to the light path, the angle of the wedge being such that the light of the recording beam reaches the same image point that it would if the refractive member were not present, said member having a dichroic reflecting coating on the incident surface thereof highly transparent to the recording light and selectively reflective of the monitoring light.

GLENN L. DIMMICK.